United States Patent
Poskanzer

[19]

[11] Patent Number: 5,943,697
[45] Date of Patent: Aug. 31, 1999

[54] CHILDREN'S CLOTHING WITH REMOVABLE ADHESIVELY ATTACHED STICKERS

[75] Inventor: Lee Poskanzer, New York, N.Y.

[73] Assignee: Mean Lee, Inc., New York, N.Y.

[21] Appl. No.: 08/893,933

[22] Filed: Jul. 15, 1997

[51] Int. Cl.$^6$ ........................................................ A41B 1/00
[52] U.S. Cl. ........................................ 2/69; 2/115; 40/586
[58] Field of Search ............................... 2/69, 108, 115, 2/105, 106, 244, 246, 1; 40/586; 434/395–399, 400

[56] References Cited

U.S. PATENT DOCUMENTS

| | | |
|---|---|---|
| 2,871,485 | 2/1959 | Greco . |
| 3,055,133 | 9/1962 | Anderson . |
| 3,484,974 | 12/1969 | Culmone ........................................ 2/115 |
| 3,724,101 | 4/1973 | Slezak . |
| 4,249,268 | 2/1981 | Berler ............................................. 2/115 |
| 4,253,197 | 3/1981 | Posta . |
| 4,710,979 | 12/1987 | Bull et al. ................................... 434/395 |
| 4,723,323 | 2/1988 | Wright, Jr. .................................. 434/395 |
| 4,820,164 | 4/1989 | Kemper ....................................... 2/115 X |
| 4,947,867 | 8/1990 | Keeton . |
| 5,269,691 | 12/1993 | Waldman . |
| 5,477,629 | 12/1995 | Gleason, Jr. ........................... 2/DIG. 2 X |

OTHER PUBLICATIONS

FLEXcon Product Data Sheets, Classics Plus 41076, No Date.
Hallmark Emblems, Inc.
Hallmark Emblems—One of the nation's largest and foremost manufacturers of Embroidered Emblems; Embroidered Emblems & Appliques—Direct Embroidery.
Embroidered Emblem.

*Primary Examiner*—Gloria Hale
*Attorney, Agent, or Firm*—Baker & Botts, L.L.P.

[57] ABSTRACT

An adaptable garment that permits a child complete flexibility in placing educational or entertainment articles thereon is disclosed. The adaptable garment includes one or more removable adhesively attachable stickers, which preferably include a pressure-sensitive acrylic adhesive layer, and a garment having a sufficiently rough surface to permit reversible adhesion with the stickers. The stickers are adhesively attached to the rough surface of the garment and are capable of being removed and relocated to substantially any other location on the rough surface of the garment by a child wearing the garment.

12 Claims, 2 Drawing Sheets

5,943,697

CHILDREN'S CLOTHING WITH REMOVABLE ADHESIVELY ATTACHED STICKERS

BACKGROUND OF THE INVENTION

I. Field of the invention

The present invention relates to children's garments such as skirts, vests, jumpers, and rainwear. In particular, the present invention relates to such garments which include removable adhesively attached stickers.

II. Description of the related art

The adaptation of garments for use in the entertainment and education of children has been recognized. Garments, and especially articles of clothing, are worn daily by children and therefore provide an optimum venue for entertainment and education. For this reason, there have been attempts at harnessing this venue in order to provide games, learning devices, and adaptable mechanisms for a child's expression.

For example, in U.S. Pat. No. 4,820,164, issue Apr. 11, 1989 to Kemper, there is disclosed a toddler's training garment which includes several "prizes" which become available as the toddler reaches more advanced stages of training. Each prize is covered by a patch that is held in place by removable stitching. When the toddler has earned a prize, the stitching is removed to uncover the prize.

Another teaching garment is disclosed in U.S. Pat. No. 4,253,197, issued Mar. 3, 1981 to Posta. Posta describes the use of indication elements, e.g., letters, that are affixed to a child's garment at predetermined locations in order to lead the child into properly dressing himself or herself.

A garment that is directed to leisure rather than education is disclosed in U.S. Pat. No. 3,055,133, issued Sep. 25, 1962 to Anderson, where a vest-like garment for use by school-age children is described. The garment includes a plurality of clear pockets which are adapted to holding pictures which the child may interchange.

As the above examples indicate, those involved with the education and appeasement of children have recognized the use of clothing as a valuable forum to satisfy those needs. Indeed, some in this field have gone so far as to experiment with educational clothing that is to be worn by a teacher, rather than a child. Thus, in U.S. Pat. No. 3,724,101, issued Apr. 3, 1973 to Slezak, there is disclosed a teaching cape which includes 21 colored patch pockets with detachable patches that display the consonants of the alphabet, and 10 patches which include vowels. Each patch includes a snap fastener so that it can be attached or detached from the cape, and a magnet so that it can be mounted on a metallic teaching board. By use of the letters on the garment, children can "instruct" the teacher to spell out words.

Unfortunately, each of the educational and entertainment oriented garments known hereto suffer from a common drawback in that they fail to give the garment-wearer complete flexibility in determining where and how to utilize the educational or entertainment driven features of the garment. Thus, the use of patches as illustrated above often requires expensive fasteners to permit the removal and relocation of the patches about the garment. Likewise, the garments discussed above require predetermined locations where educational patches and the like are to be placed. Accordingly, there remains a need for a children's garment which permits the garment-wearer complete flexibility in determining the placement of the educational or entertainment driven features of the garment.

SUMMARY OF THE INVENTION

An object of the present invention is to provide a garment which permits a child complete flexibility in determining the placement of educational or entertainment articles about the garment.

Another object of the present invention is to provide a garment which uses stickers as to propel the educational or entertainment value of the garment.

A further object of the present invention is to utilize removable adhesively attachable stickers in connection with a children's garment.

In order to meet these and other objects which will become apparent with reference to further disclosure set forth below, the present invention provides an adaptable garment that permits a child complete flexibility in placing educational or entertainment articles thereon is disclosed. The adaptable garment includes one or more removable adhesively attachable stickers and a garment having a sufficiently rough surface to permit reversible adhesion with the stickers. The stickers are adhesively attached to the rough surface of the garment and are capable of being removed and relocated to substantially any other location on the rough surface of the garment by a child wearing the garment.

In a preferred embodiment, the stickers include a pressure-sensitive acrylic adhesive layer which coats a base layer. The pressure-sensitive acrylic adhesive layer advantageously effects reversible adhesion with the garment over a wide range of temperatures and conditions. The back side of the base layer may usefully include markings which satisfy the purpose of the garment, such as educational or entertainment markings. The invention disclosed herein thus adaptably uses stickers to serve as fun or educational features of a child's garment, and permit a child wearing the garment to learn or play while wearing the garment.

The accompanying drawings, which are incorporated and constitute part of this disclosure, illustrate preferred embodiments of the invention and serve to explain the principles of the invention.

DESCRIPTION OF THE PREFERRED EMBODIMENTS

Figure 1:
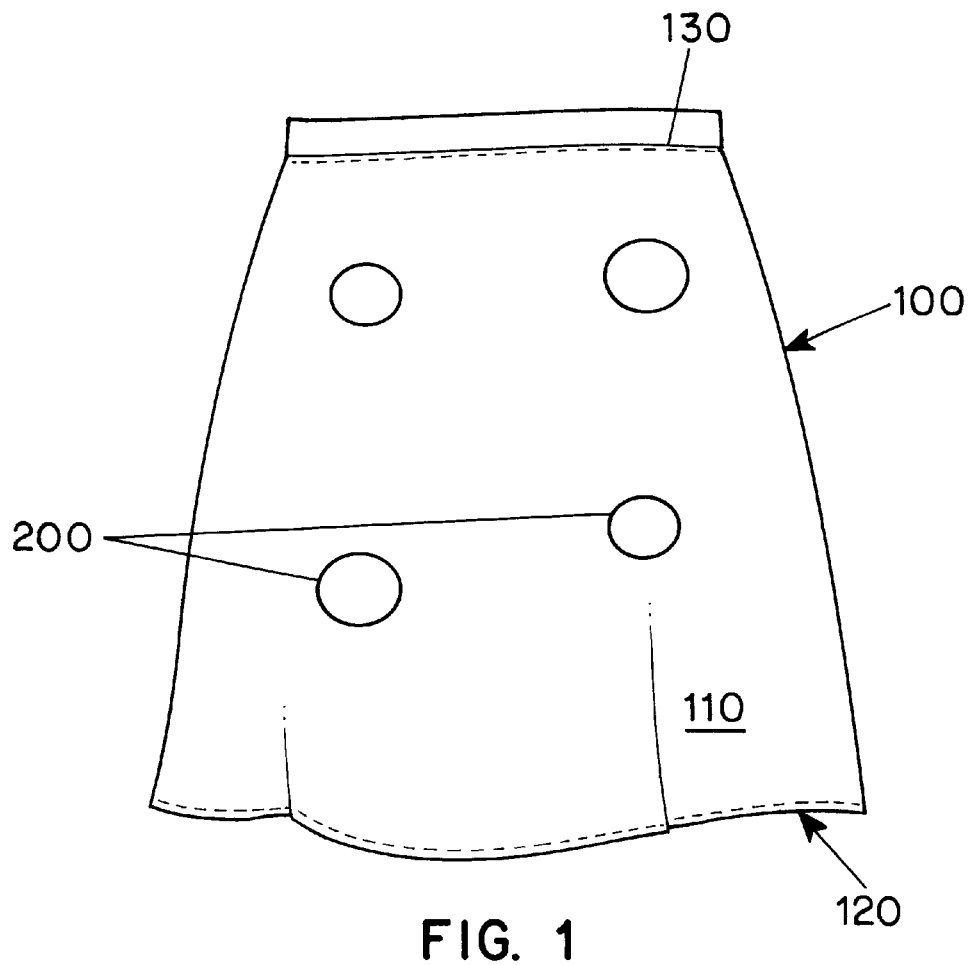
FIG. 1 is a diagram of an embodiment of the present invention.

Referring to FIG. 1, an exemplary embodiment of the present invention will now be described.

A girl's skirt 100 which acts as an educational and/or entertainment garment is illustrated. The skirt 100 includes outer layer 110, a liner 120, and several "stickers" 200 to be described in greater detail below. The skirt 100 may also include other features which are generally associated with prevailing fashion trends, such as a belt loop 130 or other features that those familiar with fashion are familiar with.

The outer layer 110 of skirt 100 should be fabricated from a poly vinyl coated fabric or other similar man-made material which provides both the necessary flexibility for a garment and has a minimum surface roughness that can be grasped by an adhesive material. Thus, although the surface of outer layer 110 may appear to be quite smooth to the unaided eye, it must have sufficient small-scale dimpling or surface defects to permit mechanical adhesion with the stickers 200, which will be described in greater detail below.

In a preferred embodiment, outer layer 110 is fabricated from polyurethane. It has been determined that the use of polyurethane as the material for top layer 110 enables superior cohesion with stickers. Liner 120 can be made from any known fabric such as cotton, wool, linen, satin, silk and the like, from man-made materials like polyester, nylon, or rayon, or from some combination of natural and synthetic fibers, and serves to enhance the comfort of the skirt 100 when it is worn by a child.

Figure 2A:
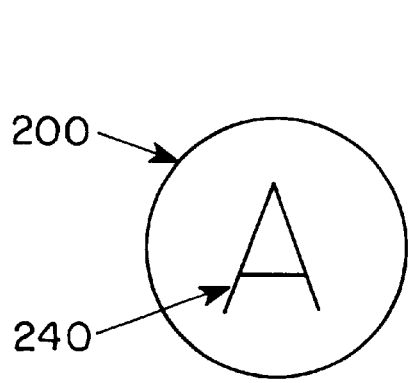
FIGS. 2a and 2b are diagrams of a sticker useful in the embodiment of FIG. 1, FIG. 2a being a perspective view of a sticker and FIG. 2b being a side view of the same sticker.

With reference to FIG. 2, the stickers 200 are removable stickers which can be adhesively attached and detached from skirt 100. When the garment is to be worn by a young child, the stickers 200 should be large enough, e.g., having a surface area of at least 16 $cm^2$ to prevent the child from swallowing the sticker when it is removed from the garment.

The stickers 200 include an adhesive layer 210 which permits reversible adhesion with skirt 100. The type of adhesive material used in layer 210 will impact the material choices for outer layer 110 of skirt 100, as different adhesives adhere to different materials with varying levels of success.

Figure 2B:
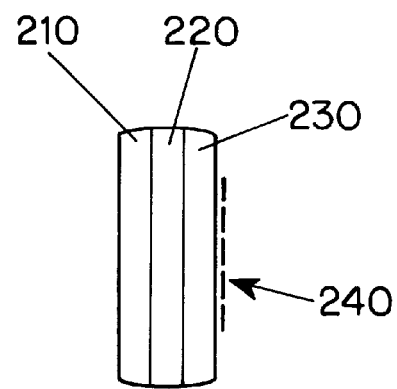

In a preferred embodiment, where the outer layer 110 of skirt 100 is fabricated from polyurethane, the use of a solvent-based pressure sensitive acrylic adhesive for layer 210 advantageously enables cohesion between the sticker 200 and the garment 100 that withstands normal movement of a child, while simultaneously permitting a child to remove the sticker 200 as desired. Commercially available pressure-sensitive acrylic adhesive material, such as material sold under the Classics Plus brand name by the FLEXcon company, 1 FLEXcon Industrial Park, Spencer, Mass. 01462-2624, provides an average of 42 Newtons per meter of adhesive force, and is able to provide adhesion within the temperature range of −40° F. though 176° F. These properties are more than sufficient for effecting removable contact between the stickers 200 and garment 100 during most conceivable conditions. In this preferred embodiment, the sticker is fabricated with four layers of material, as illustrated in FIG. 2b. A flexible white vinyl film 230 is coated with the adhesive 220 on one side thereof that is backed with a two sided poly coated lay flat release liner 210. On the outside face of film 230, there is placed a suitable marking 240, e.g., the letter "A" shown in FIG. 2A.

The marking 240 may be printed on the film 230, or placed on the film 230 by any other commercially available technique, e.g., by painting or screening. The marking should be chosen to satisfy the purpose of the garment, i.e., educational or entertainment driven. If the garment 100 is intended to be used to promote a child's education, letters, numbers, punctuation or even mathematical symbols would be suitable for inclusion as the marking 240. If the garment 100 is to be used for pleasure, the marking 240 may take the form of animals, symbols or other FIGures. In this way, the stickers 200 serve as fun or educational features of garment 100, and permit a child wearing the garment to learn or play while wearing the garment.

Although the sticker 200 shown in FIG. 2 is circular in shape, the stickers can be fabricated in any shape in accordance with prevailing educational or fashion trends. Likewise, although the garment 100 of FIG. 1 is illustrated to be a skirt, the principals of the present invention apply with equal force to other articles of clothing, such as vests, rainware, boots, jumpers, hats and the like, and even to certain accessories such as knapsacks, bookbags, handbags and wallets. As used herein, the term "garment" is meant to be inclusive of all such articles of clothing and accessories.

Figure 3:
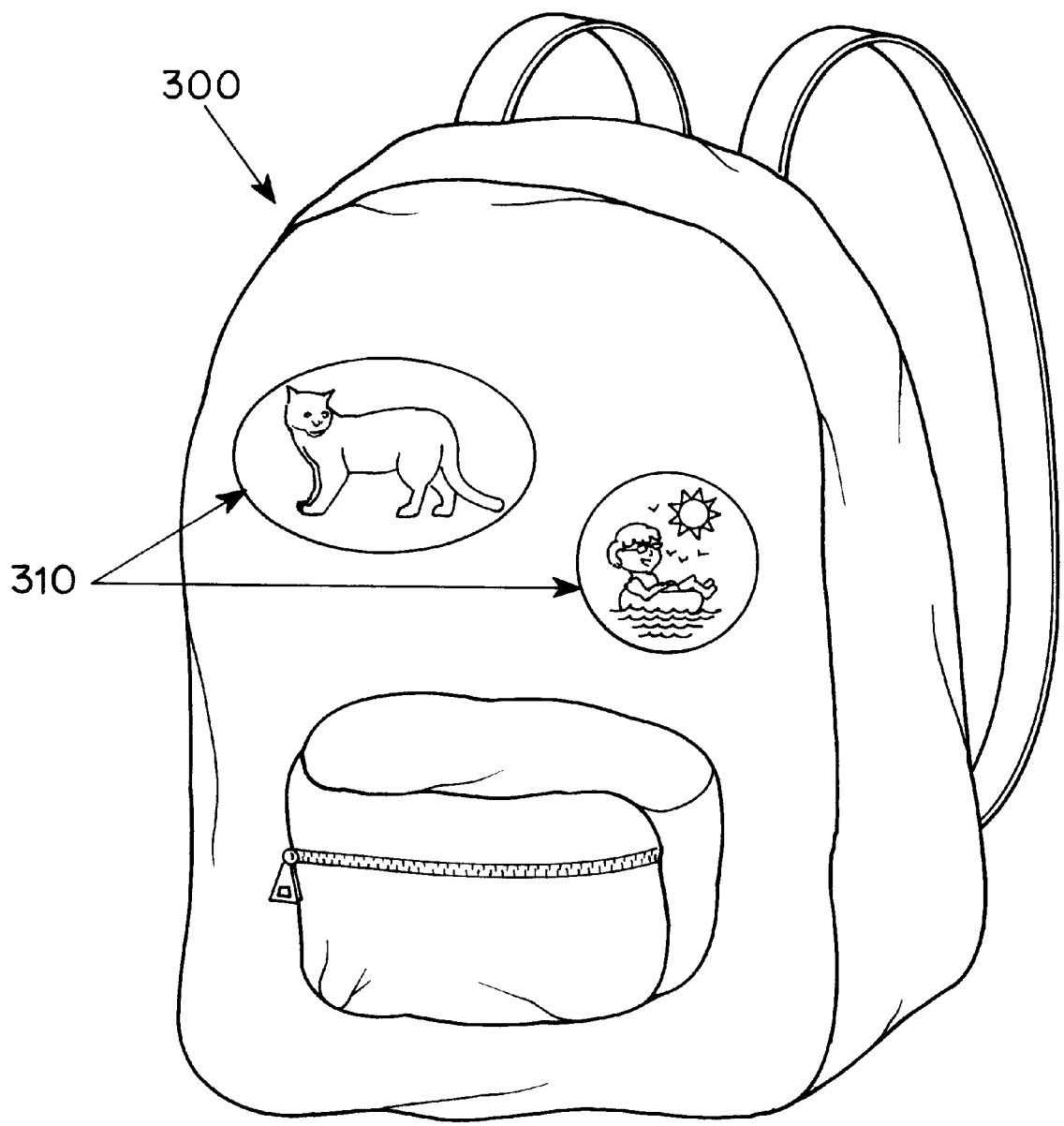
FIG. 3 is a diagram of an alternative embodiment of the present invention.

Thus, referring to FIG. 3, an alternative embodiment of the present invention is shown where a knapsack 300 fabricated from polyurethane is shown. The knapsack 300 is fabricated in a manner similar to the skirt shown in FIG. 2, and includes several stickers 310 which depict animals and scenes.

Accordingly, the foregoing merely illustrates the principles of the invention. Various modifications and alterations to the described embodiments will be apparent to those skilled in the art in view of the inventors teachings herein. It will thus be appreciated that those skilled in the art will be able to devise numerous systems and methods which, although not explicitly shown or described herein, embody the principles of the invention and are thus within the spirit and scope of the invention.

I claim:

1. An adaptable garment providing a person flexibility in placing educational or entertainment articles thereon, comprising:

(a) one or more, repeatedly relocatable attachable stickers having an adhesive thereon; and (b) a garment having a sufficiently rough surface to permit adhesion with said stickers, said stickers being attached to said rough surface of said garment by said adhesive and capable of being removed and relocated to substantially any other location on said rough surface of said garment by said person.

2. The adaptable garment of claim 1, wherein said garment comprises polyurethane.

3. The adaptable garment of claim 1, where in said removable, repeatedly relocatable adhesively attachable stickers comprise:

(a) a base layer; and (b) a pressure-sensitive acrylic adhesive layer coated on said base layer, said pressure-sensitive acrylic adhesive layer effecting said reversible adhesion with said garment.

4. The adaptable garment of claim 3, wherein said pressure-sensitive acrylic adhesive layer comprises a solvent-based pressure-sensitive acrylic adhesive material.

5. The adaptable garment of claim 3, wherein said base layer comprises vinyl.

6. The adaptable garment of claim 5, wherein said removable, repeatedly relocatable, adhesively attachable stickers further comprise one or more markings, such that said person may remove and repeatedly relocate said stickers about said garment for educational or entertainment purposes.

7. The adaptable garment of claim 1, wherein said garment comprises a man-made material which appears smooth to the unaided eye.

8. The adaptable garment of claim 7, wherein said garment comprises a polyvinyl coated fabric.

9. The adaptable garment of claim 8, wherein said removable, repeatedly relocatable, adhesively attachable stickers comprise:

(a) a base layer; and
(b) a pressure-sensitive adhesive layer coated on said base layer, said pressure-sensitive adhesive layer effecting said reversible adhesion with said garment.

10. The adaptable garment of claim 9, wherein said base layer comprises vinyl.

11. The adaptable garment of claim 9, wherein said garment is an article of children's clothing and said removable, repeatedly relocatable, adhesively attachable stickers further comprise one or more markings, such that said person may remove and repeatedly relocate said stickers about said article of clothing for educational or entertainment purposes.

12. The adaptable garment of claim 9, wherein said garment is an accessory and said removable, repeatedly relocatable, adhesively attachable stickers further comprise one or more markings, such that said person may remove and repeatedly relocate said stickers about said accessory for educational or entertainment purposes.

\* \* \* \* \*